Nov. 27, 1956     K. M. ELLIOTT     2,772,216
REFORMING AT A PLURALITY OF SEVERITIES WITH
CONSTANT RECYCLE GAS OF OPTIMUM HYDROGEN
CONCENTRATION TO ALL ZONES Filed May 1, 1952     3 Sheets-Sheet 2

INVENTOR.
KENNETH M. ELLIOTT
BY
AGENT

Fig.3

United States Patent Office

2,772,216
Patented Nov. 27, 1956

2,772,216

REFORMING AT A PLURALITY OF SEVERITIES WITH CONSTANT RECYCLE GAS OF OPTIMUM HYDROGEN CONCENTRATION TO ALL ZONES

Kenneth M. Elliott, Woodbury, N. J., assignor to Socony Mobil Oil Company, Inc., a corporation of New York Application May 1, 1952, Serial No. 285,483

3 Claims. (Cl. 196—50)

The present invention relates to reforming hydrocarbons at a plurality of reforming severities with recycle gas of at least minimum hydrogen content for the production of a tolerable amount of coke on the catalyst and, more particularly, to reforming hydrocarbons employing a split-flow feed having a plurality of zones in which the reforming severities are different and the coke lay-down is maintained at a tolerable level without the addition of hydrogen from an extraneous source and without removing light hydrocarbons from the recycle gas.

It is well known that in a reforming operation, although the amount of hydrogen produced may be greater under severe reforming conditions than that produced in reforming under less severe conditions, the concentration of hydrogen in the gaseous products of the more severe reforming operation actually can be lower because of excessive production of other gases as the result of side reactions such as cracking. Consequently, as the reforming severity is increased, the hydrogen concentration in the gas available for recycle to the reactor decreases. This results in a greater production of coke on the catalyst during the more severe reforming operation.

It is also well known that some stocks produce less hydrogen than other stocks upon reforming with the result that a hydrogen deficient or lean gas is recycled; this also results in excessive lay-down of coke on the catalyst.

The generally accepted practice to date has been to increase the hydrogen concentration of such lean recycle gases by adding hydrogen obtained from an extraneous source and/or by concentrating the hydrogen in the lean gas by removing a portion of the hydrocarbons contained therein. Either method of raising the hydrogen concentration of the lean gas to the optimum for minimum coke lay-down on the catalyst involves a considerable additional cost to the basic reforming cost of producing the high antiknock gasoline or aromatic hydrocarbons. If either of these palliatives is to be avoided and gasoline of different antiknock ratings produced or stocks producing different amounts of hydrogen are to be treated in the same equipment another problem is encountered.

When a reforming plant is designed for use with a moving bed of catalyst, the limiting factor for a reactor of given capacity is the capacity of the kiln to burn off the coke laid down in the reactor. Consequently, since it is invariable practice to produce gasolines of different antiknock ratings in the same reactor and since the antiknock rating is to a large extent dependent upon the severity of the reforming conditions, the coke lay-down per hour will vary with the antiknock or octane rating of the gasoline produced when the recycle gas is the gas produced in the reactor without the addition of hydrogen or the removal of light hydrocarbons. As a consequence, for a reactor of given feed capacity when operating to produce a gasoline of say 87 F–1 clear octane number and recycling the hydrogen containing gas produced, the coke lay-down will be about 10 percent of the coke lay-down when operating the same reactor on the same charge at the same rate of feed with recycle of the hydrogen containing gas to produce a gasoline of 99 F–1 clear octane number. Therefore, since it is common practice to operate to produce the lower octane number gasoline for say 70 percent of the on stream time and to produce the higher octane number gasoline for say 30 percent of the on stream time, the kiln must be designed to handle the maximum amount of coke laid down during operation to produce the higher octane number gasoline or the kiln must be designed to handle the maximum amount of coke laid down during operation to produce the lower octane number gasoline or a compromise in design between the two extremes accepted.

With the first kiln design the plant is inefficient during operation to produce the lower octane number gasoline. That is, the kiln is "over-designed." In the second alternative, the capacity of the reactor for the production of higher octane number gasoline is reduced. For the third alternative, neither of the extremes of the other alternatives must be accepted, but neverthless the plant is not the most efficient.

It has now been discovered that the problem can be solved without resort to "over-designing," to compromise designing, to the use of hydrogen from an extraneous source, or to removal of light hydrocarbons.

It is an object of the present invention to provide a means of operating a reformer at various levels of severity in which the particle form catalyst passes successively through a plurality of zones of different severities as a substantially compact column to produce an optimum amount of coke without resort to the addition of hydrogen from an extraneous source to the recycle gas or to the concentration of hydrogen in the lean gas by removal of light hydrocarbons from the lean gas. It is another object of the present invention to provide a means of operating a reformer at a plurality of severity levels simultaneously in which the particle form catalyst passes successively through a plurality of zones of different severities thereby producing effluent gases from each zone having different concentrations of hydrogen and supplying hydrogen-containing gas of the same hydrogen concentration and optimum for the minimum overall coke production to each zone without the addition of hydrogen from an extraneous source to said effluent gases and without removal of light hydrocarbons from the lean effluent gases. It is a further object of the present invention to provide a method of operating a reformer at various levels of severity simultaneously in which the particle form catalyst passes successively through a plurality of zones of different severities as a substantially compact column in which the severity of treatment is controlled by regulating the amount of feed passing through each zone or by regulating the volume of catalyst in each zone or by regulating the amount of feed passing through and the volume of catalyst in each zone to produce effluent gases from each zone having different concentrations of hydrogen and supplying hydrogen-containing gas of the same hydrogen concentration and optimum for the minimum overall coke production to each zone without the addition of hydrogen from an extraneous source to said effluent gases and without removal of light hydrocarbons from said effluent gases. Other objects and advantages of the present invention will become apparent to those skilled in the art from the following discussion taken in conjunction with the drawings, in which.

In prior art operation of reformers having a moving catalyst bed such as employed in the reformers illustrated in the drawings, it has been the practice to operate the reformer for a period of time say 70 percent of the total on-stream time to produce motor gasoline and for the balance of the on-stream time, say 30 percent of the total to produce aviation gasoline. In other words, for say 70 percent of the on-stream time the reformer was operated at a relatively low severity and for the balance of the time at a relatively high severity. As a consequence, the concentration of hydrogen in the gases produced during the period of operation at relatively low severity was sufficiently high that low coke lay-down could be obtained without adding hydrogen from an extraneous source to the gases produced or without passing the gases produced through an absorber to remove the light hydrocarbons. However, during operation under the more severe conditions to produce aviation gasoline the hydrogen concentration in the gases produced was sufficiently low that either hydrogen from an extraneous source was added to the recycle gas or the gases produced were passed through an absorber to remove the light hydrocarbons so that the coke lay-down would not be appreciably greater than that during the production of the motor gasoline so that the capacity of the kiln, sufficient when producing motor gasoline, would not be exceeded during the production of aviation gasoline. Thus, for say 70 percent of the on-stream time, the extraneous hydrogen producing plant or the absorber for light hydrocarbons remained idle.

On the other hand, under previously accepted conditions of operation when the lean gases produced during the period of production of aviation gasoline were not enriched either by the addition of hydrogen from an extraneous source or by absorption of light hydrocarbons, the coke lay-down during the period of production of aviation gasoline was such that either a larger kiln was necessary or the amount of feed to the reformer was reduced far below the capacity of the reformer when operating to produce motor gasoline.

To illustrate this problem as solved by the present invention without the addition of hydrogen from an extraneous source to the hydrogen lean gases or absorption of light hydrocarbons from the hydrogen lean gases produced during operation under the relatively more severe conditions necessary to produce aviation gasoline, the reforming of virgin Venezuelan naphtha to raise the octane number from 39.0 (F-1 clear) or 59.0 (F-1+3 cc. TEL/gal.) to 87.0 (F-1 clear) or 96.3 (F-1+3 cc. TEL/gal.) (motor gasoline) to 99.0 (F-1 clear) or 104.3 (F-1+3 cc. TEL/gal.) (aviation stock) will be discussed. In the first case, blocked-out operation, i. e., 67 percent of the on-stream time used to produce motor gasoline and 33 percent of the on-stream time used to produce aviation stock, will be illustrated with respect to the coke lay-down when the gases produced are not enriched by addition of hydrogen from an extraneous source or by absorption of the light hydrocarbons therefrom. In the second case, simultaneous production of motor gasoline and aviation stock in the proportion of 67 percent of motor gasoline and 33 percent aviation stock in a split-feed reformer without enrichment of the gases produced in the zone operating under the more severe conditions by the addition of hydrogen from an extraneous source or by absorption of light hydrocarbons therefrom will be discussed with respect to coke lay-down.

In each of the cases to be discussed, the charge stock was a virgin Venezuelan naphtha having an octane rating of 39 (F-1) and 59 (F-1+3 cc. TEL/gal.) and a boiling range of 200°-400° F. The catalyst used was a chromia-alumina catalyst containing at least 70 mol percent alumina. The average operating conditions were as follows:

*Average operating conditions in the reactor*

Operating pressure_______________ 190 p. s. i. a.
Average space velocity___________ 0.7 liquid volume of naphtha/volume of catalyst/hour.
Vapor inlet temp., ° F___________ 1050.
Catalyst inlet temp., ° F________ 1025.
Gas recycle ratio:
  Mols gas/mols naphtha_________ 6.
Vapor steam heat capacity/catalyst stream heat capacity. 0.5
Reactor capacity_________________ 10,000 B. P. S. D.

The data for Case I (blocked-out operation) is presented in Table I for a 10,000 B. P. S. D. operation:

TABLE I

| Operating Pressure—190 p. s. i. a. | Once through cocurrent blocked-out operation. | |
| --- | --- | --- |
| Percent of on-stream time | 67 | 33 |
| Vapor Inlet Temp., ° F | 988 | 1,038 |
| Catalyst Inlet Temp., ° F | 988 | 1,038 |
| Vapor Outlet Temp., ° F | 965 | 1,010 |
| Average Reactor Temp., ° F | 970 | 1,015 |
| Space Velocity | 0.7 | 0.7 |
| Hydrogen Content: | | |
|   Reactor Effluent, Mol percent | 53.0 | 35.0 |
|   Recycle Gas, Mol percent | 53.0 | 35.0 |
| Octane Number: | | |
|   F-1 (clear) | 87.0 | 99.0 |
|   F-1 + 3 cc. TEL/gal | 96.3 | 104.3 |
| Coke Yield: | | |
|   Wt. percent of Reactor charge | 0.41 | 4.0 |
|   Lbs./hour | 450 | 4,400 |

It is manifest that on a blocked-out operation when hydrogen from an extraneous source is not added to the effluent gases in the period during which the reformer is being operated under the more severe conditions and light hydrocarbons are not absorbed from the effluent gases, the coke lay-down is about 10 times the lay-down in the period during which the reformer is being operated under the less severe conditions.

Similarly, when the reformer is being operated to produce simultaneously the motor gasoline and the aviation stock (Case II) when the effluent gases from the zone operating under the more severe conditions are not enriched by the addition of extraneous hydrogen nor by absorbing the light hydrocarbons, the coke lay-down is about 4 times that when the reformer is being operated under the less severe conditions. The data for such an operation in which the effluent gases from the zone operating under the more severe conditions is not enriched in the prior art manner are presented in Table II:

TABLE II

| | |
|---|---|
| Operating pressure p. s. i. a. | 190 |
| Average space velocity | 0.7 |
| Vapor inlet temp., °F | 1050 |
| Catalyst inlet temp., °F | 1025 |
| Gas recycle: | |
|   Mols gas/mols naphtha | 6 |
| Vapor stream heat capacity/catalyst stream heat capacity | 0.5 |

| | Split Flow Split Bed Reactor Operation | |
|---|---|---|
| Section of Reactor | Top | Bottom |
| Vol. of section of catalyst bed as percent of total bed | 26 | 74 |
| Vol. of vapors as percent of total charge | 67 | 33 |
| Space Velocity | 1.8 | 0.31 |
| Inlet Temp., °F | 992 | 1,016 |
| Outlet Temp., °F | 1,025 | 994 |
| Average Temp., °F | 999 | 998 |
| Hydrogen Content: | | |
|   Reactor Section Effluent Gas, Mol percent | 53.0 | 35.0 |
|   Recycle Gas, Mol percent | 53.0 | 35.0 |
| Octane Number: | | |
|   F-1 (clear) | 87.0 | 99.0 |
|   F-1 + 3 cc. TEL/gal | 96.3 | 104.3 |
| Coke Yield: | | |
|   Weight percent of charge to reactor section | 0.41 | 4.0 |
|   Lbs./hour | 1,760 | |
|   Weight percent total reactor charge | 1.60 | |

Thus, when operating to produce two gasolines of different octane ratings and without enriching the lean gas by addition of hydrogen from an extraneous source and without removing light hydrocarbons, the coke lay-down is excessive.

It has now been discovered that this problem can be solved in a split-feed operation without the use of a source of extraneous hydrogen and without absorbing the light hydrocarbons from the hydrogen-lean gas.

Thus, in a split-feed operation such as discussed in Case II, gasolines of the same octane ratings as produced in Case II can be obtained at a much lower coke yield without the use of a source of extraneous hydrogen and without absorbing light hydrocarbons from the hydrogen-lean gases.

Case III is an illustrative example of an operation in accordance with the principles of the present invention to produce simultaneously a motor gasoline and an aviation stock with low overall coke yield without the addition of extraneous hydrogen to the hydrogen-lean gases from the zone operating under the more severe conditions and without absorbing light hydrocarbons from the hydrogen-lean recycle gases.

The average operating conditions and the data obtained thereunder for Case III are given in Table III.

TABLE III

*Average operating conditions*

| | |
|---|---|
| Operating pressure p. s. i. a. | 190 |
| Average space velocity | 0.7 |
| Vapor inlet temp., °F | 1050 |
| Catalyst inlet temp., °F | 1025 |
| Gas recycle ratio: | |
|   Mols gas/mols naphtha | 6 |
|   Mols hydrogen/mols naphtha | 2.8 |
| Vapor stream heat capacity/catalyst stream heat capacity | 0.5 |

| Section of Reactor | Top | Bottom |
|---|---|---|
| Vol. of Section of Catalyst Bed as percent of total bed | 26 | 74 |
| Vol. of vapors as percent of total charge | 67 | 33 |
| Space Velocity | 1.8 | 0.31 |
| Inlet Temp., °F | 992 | 1,016 |
| Outlet Temp., °F | 1,025 | 994 |
| Average Temp., °F | 999 | 998 |
| Hydrogen Content: | | |
|   Reactor Section Effluent Gas, Mol percent | 48.0 | 44.1 |
|   Recycle Gas, Mol percent | 46.8 | 46.8 |
| Octane Number: | | |
|   F-1 (clear) | 87.0 | 99.0 |
|   F-1+3 cc. TEL/gal | 96.3 | 104.3 |
| Coke Yield: | | |
|   Weight percent of charge to reactor section | 0.52 | 2.5 |
|   Lbs./hour | 1,300 | |
|   Weight percent total reactor charge | 1.18 | |

From the foregoing data for Cases I, II and III, it is manifest that when operating without the use of an extraneous source of hydrogen and without absorbing light hydrocarbons from the recycle gases, the yield of coke on a 10,000 B. P. S. D. unit can be as high as 4400 pounds per hour, while when operating in accordance with the principles of the present invention, the yield of coke on a 10,000 B. P. S. D. unit is only about 1300 pounds per hour or about 30 percent as much.

In general, the reforming operation is carried out in accordance with the principles of the present invention within the following ranges:

TABLE IV

| Reactor | Broad | Preferred |
|---|---|---|
| Vapor Inlet Temp., °F | 850–1,080 | 960–1,060 |
| Catalyst Inlet Temp., °F | 100–1,100 | 400–1,050 |
| Pressure, p. s. i. a | 15–600 | 100–300 |
| Gas Recycle Ratio: | | |
|   Mols Gas/Mols Naphtha | 1–15 | 4–10 |
|   Mols Hydrogen/Mols Naphtha | 1–8 | 2–5 |
| Average Liquid Space Velocity in Reactor, liq. vol. naphtha/vol. cat./hour | 0.1–6.0 | 0.5–2.0 |
| Vol. percent of bed above reactor inlet | 80–20 | 75–25 |
| Vapor Stream Heat Capacity/Catalyst Stream Heat Capacity | 80–0.05 | 40–0.2 |
| Percent vapor flow to upper reforming zone | 95–5 | 75–25 |

| Kiln: | Broad | Preferred |
|---|---|---|
|   Temperature, °F | 600–1,400 | 700–1,100 |
|   Pressure, p. s. i. a | 15–600 | 15–35 |

The ratio vapor-stream-heat-capacity to catalyst-stream-heat-capacity is the ratio of the product of the pounds of naphtha entering the reactor per hour and its specific heat to the product of the pounds of catalyst entering the reactor per hour and its specific heat.

In general, the present invention provides a method of operating a reformer having a plurality of zones under reforming conditions of different severities or a plurality of reformers under reforming conditions of different severities through which a particle form reforming catalyst passes successively in series as a substantially compact column in which the ratio of the vapor stream heat capacity to the catalyst stream heat capacity is about 80 to 0.05 and preferably about 40 to 0.2 and in which the effluent gases boiling below the initial boiling point of the gasoline produced in each zone are mixed in such proportion that the mixed gases provide a recycle gas containing about 25 to about 80 percent hydrogen and preferably about 35 to about 60 percent hydrogen, balance $C_1$ to $C_6$ hydrocarbons in amount sufficient to provide about 1 to about 8 and preferably about 2 to about 5 mols of hydrogen per mol of naphtha; the molecular weight of the naphtha the average determined in the usual manner from the A. S. T. M. distillation curve.

Under some operating conditions it is possible to mix the total gases from the zone of greater reforming severity with the total gases from the zone of lesser severity and obtain a recycle gas containing about 25 to about 80 and preferably about 35 to about 60 percent hydrogen, balance $C_1$ to $C_6$ hydrocarbons in sufficient amount to provide about 1 to about 8 and preferably about 2 to about 5 mols of hydrogen per mol of naphtha without adding extraneous hydrogen to the recycle gas or absorbing light hydrocarbons from the recycle gas. Under other conditions of operation, it will be necessary to mix only a portion of the total gases boiling below the initial boiling point of the gasoline produced in the zone operating under the conditions of greater severity with the total gases boiling below the initial boiling point of the gasoline produced in the zone operating under reforming conditions of lesser severity to provide a mixed recycle gas containing about 25 to about 80 and preferably about 35 to about 60 percent hydrogen balance $C_1$ to $C_6$ hydrocarbons in sufficient amount to provide about 1 to about 8 and preferably about 2 to about 5 mols of hydrogen per mol of naphtha without adding hydrogen from an extraneous source to the recycle gas or without absorbing light hydrocarbons from the recycle gas.

Those skilled in the art can readily calculate the ratio in which the hydrogen-lean gas can be mixed with the hydrogen-rich gas to provide a mixed recycle gas containing about 25 to about 80 and preferably about 35 to about 60 percent hydrogen in amount sufficient to provide about 1 to about 8 and preferably about 2 to about 5 mols of hydrogen per mol of naphtha. The percent of the total recycle gas provided by the hydrogen-rich effluent gases can be readily calculated from the equation where $A_r$ is the percent of the total recycle gas derived from the hydrogen-rich effluent gases containing B percent hydrogen and $100 - A_r$ is the percent of the total recycle gas derived from the hydrogen-lean effluent gases containing C percent hydrogen:

$$A_r B + C(100 - A_r) = .25 \text{ to } .80$$

Thus, in Case III where the hydrogen-rich gases contained 48 percent hydrogen, the hydrogen-lean gases contained 44.1 percent hydrogen and the mixed recycle gases contained 46.8 percent hydrogen, it can readily be calculated that the hydrogen-rich gases are about 70 percent of the total recycle gas and the balance hydrogen-lean gas from the other zone.

Figure 1:
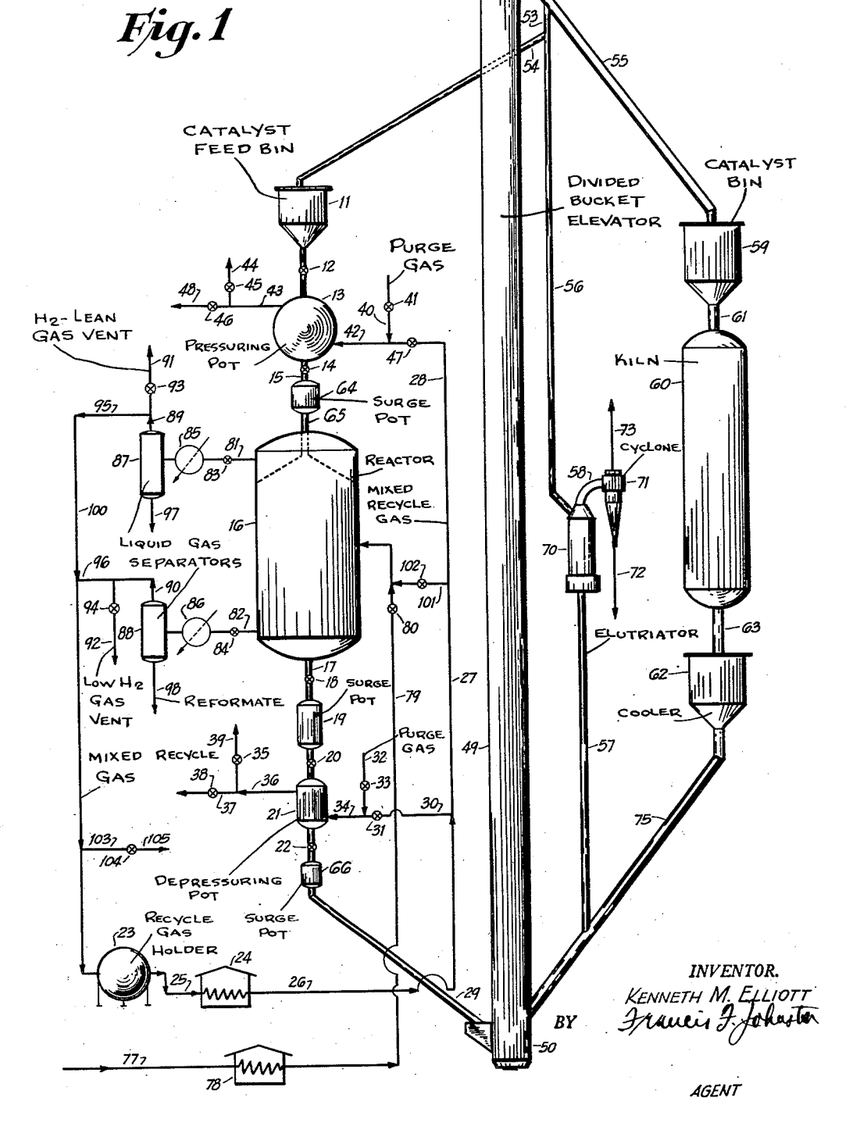
Figure 1 is a highly diagrammatic illustration of a method of operating a reformer in accordance with the principles of the present invention to produce simultaneously gasolines of different octane ratings and gases containing different concentrations of hydrogen in two zones of different severity wherein the overall coke lay-down is such as to be appreciably less than that produced without raising the concentration of hydrogen in the gases produced in the zone of greater severity by the addition of hydrogen from an extraneous source or by removing light hydrocarbons from the gases produced in the zone of greater severity.

In describing the method of the present invention, reference is made first to Figure 1. The course of the catalyst through the reactor and kiln will first be described followed by a description of the course of the vaporous reactant through the reactor.

In general, the charge stock can be any suitable hydrocarbon or mixture of hydrocarbons which can be converted to an aromatic hydrocarbon or mixture of aromatic hydrocarbons. For the purpose of illustrating the invention, the reforming of virgin naphtha will be described although it is to be understood that mixtures of virgin naphtha and cracked naphtha or cracked naphtha alone can be used as a feed to the reformer.

While any suitable reforming catalyst can be used, it is preferred to use a chromia-alumina reforming catalyst containing at least 70 mol percent alumina.

In general, catalytic reforming comprises contacting a suitable reforming catalyst with a primarily aliphatic charge stock usually a naphtha having a boiling range of about 150° to about 450° F. under conditions of temperature and pressure such that hydrogenation, dehydrogenation and cyclization occur. At present it is preferred to employ a chromia-alumina catalyst comprising at least 70 mol percent alumina and about 18 to about 30 mol percent chromia, although other particle form reforming catalysts can be used. The reforming reaction or reactions are carried out at a temperature of about 800° to about 1300° F. at a pressure of about 15 to about 600 p. s. i. a. However, it is preferred to use reaction temperatures of about 900° to about 1050° F. and pressures of about 100 to 300 p. s. i. a.

During the reforming operation, the particle-form solid contact material or particle form catalyst becomes deactivated by a deposition of carbonaceous contaminant. This contaminant is removed and the catalyst activated by burning off the carbonaceous contaminant in a stream of combustion supporting gas such as air at elevated temperatures of about 600° to about 1400° F. and preferably at about 700° to about 1100° F. at a pressure of about 15–600 p. s. i. a. and preferably about 15 to about 35 p. s. i. a.

The catalyst enters the reactor or converter at a temperature of about 100° to about 1100° F. and preferably at a temperature of about 400° to about 1050° F.

Turning now to Figure 1. In Figure 1 is illustrated a method of operating a reformer to simultaneously produce two gasolines of different octane ratings at a tolerable coke yield without adding hydrogen from an extraneous source to the recycle gas or without absorbing light hydrocarbons from the recycle gas in accordance with the principles of the present invention. When describing the method of operation illustrated in Figure 1, the course of the catalyst through the reactor and kiln will be described first and then the course of the reactant and effluent gases.

Thus, a suitable active reforming catalyst is accumulated in catalyst feed bin 11, flows therefrom into a reactor or converter sealing means such as the pressuring lock formed between gas-tight valves 12 and 14 and including pressuring chamber or pot 13 when the reactor is operating at a pressure greater than 15 p. s. i. a.

The particular sealing means illustrated operates in a cyclic manner as follows: With gas-tight valves 12 and 14 closed and pressure pot 13 substantially devoid of catalyst, a purge gas, i. e., an inert and/or non-flammable gas, such as flue gas, is drawn from a source not shown through line 40 with valve 41 open and discharged into pot 13 through line 42 with valve 47 closed. The purge gas is vented from pressuring pot 13 through lines 43 and 44 with valve 46 closed and valve 45 open. After purging pressuring chamber 13 with gas-tight valve 14 closed, gas-tight valve 12 is opened and catalyst flows into pressuring pot 13 to a predetermined level. Gas-tight valve 12 is closed and pressuring gas such as a recycle gas containing about 25 to about 80 percent hydrogen and preferably about 35 to about 60 percent hydrogen, balance $C_1$ to $C_6$ hydrocarbons introduced into pressuring chamber 13 until the pressure in chamber 13 is raised to at least that of reactor 16. Usually the pressure in chamber 13 is raised to about 20 to about 600 p. s. i. a., dependent upon the pressure in reactor or converter 16.

The pressure in pressuring chamber 13 is raised to at least that of reactor 16 by introducing a recycle gas into pot 13, for example, from holder 23 through lines 25 and 26 and 27 into line 28 and line 42 with valve 47 open and valve 41 closed. Gas-tight valves 12 and 14 and vent valves 45 and 46 also are closed.

After the pressure in pressuring chamber 13 has been raised to at least that of reactor or converter 16, valve 47 is close and gas-tight valve 14 opened and the catalyst flows into surge chamber 64 through conduit 15. When pressuring chamber 13 is substantially empty of catalyst, gas-tight valve 14 is closed, valve 46 is opened, and the pressure in chamber 13 is reduced to atmospheric by passing the residual gas contained therein through lines 43 and 48 to a flare not shown. This completes the cycle.

It will be understood by those skilled in the art that there can be a pair of sealing means such as the pressure lock, described hereinbefore, operating alternately and feeding catalyst into one reactor. From this point the course of the catalyst through the reactor and regenerator or kiln will be followed and then the course of the charge stock through the reactor and the effluent gases and products will be followed.

The catalyst in surge chamber 64 flows as a substantially compact column from surge chamber 64 through conduit 65 into reactor 16. The catalyst enters reactor 16 at a temperature of about 100° to about 1100° F. and preferably at about 400° to about 1050° F. The catalyst flows downwardly through converter 16 as a compact column of particle form solid contact material. The spent catalyst leaves reactor 16 through conduit 17. From conduit 17 the spent catalyst flows through a suitable catalyst flow control device such as valve 18 into surge pot 19 and thence through a suitable reactor sealing means.

When the pressure in reactor 16 is greater than 15 p. s. i. a. a suitable sealing means is necessary. For example, the depressuring lock formed between gas-tight valves 20 and 22 and including depressuring chamber or pot 21 or other methods for removing catalyst from a superatmospheric pressure reactor can be employed.

The depressuring lock formed between gas-tight valves 20 and 22 operates in a cyclic manner similar to that previously described for the pressuring lock as follows: With gas-tight valves 20 and 22 closed, pressuring gas such as the aforementioned recycle gas is drawn from holder 23 through lines 25, 26, 27 and 30 and introduced into depressuring pot 21 through line 34 with valve 31 open and valves 33, 38 and 35 closed until the pressure in depressuring pot 21 is at least that of reactor 16. Valve 31 is then closed, gas-tight valve 20 opened and spent catalyst flows from surge pot 19 into depressuring pot 21 to fill pot 21 with catalyst to a predetermined level. Gas-tight valve 20 is then closed. The pressure in depressuring pot 21 is then reduced to that of the kiln or regenerator which is about 15 to 600 p. s. i. a. and preferably about 15 to about 35 p. s. i. a. by opening valve 38 and passing the gas in pot 21 through lines 36 and 37 with valve 35 closed to a flare not shown.

When the pressure in depressuring pot 21 has been reduced to at least that of the kiln, valve 38 is closed and with valve 31 closed and valves 33 and 35 open a purge gas, i. e., an inert and/or non-flammable gas such as flue gas drawn from a source not shown, is passed through lines 32 and 34 into depressuring pot 21 and vented through lines 36 and 39. After purging depressuring pot 21, gas-tight valve 22 is opened and the catalyst flows into surge tank 66 and thence into chute 29. After depressuring pot 21 is substantially empty of catalyst, valve 22 is closed, thus completing the cycle.

The catalyst flows through chute 29 to any suitable catalyst transferring device such as a gas-lift or, as illustrated, an elevator such as bucket elevator 49 having boot 50. The catalyst flowing through chute 29 into boot 50 is picked up by the elevator buckets, and raised to elevator head 51 where the buckets discharge into spout 52.

The elevator 49 is of the type more fully described in U. S. Patent No. 2,531,192, and is provided with divided buckets. Activated or regenerated catalyst from kiln or regenerator 60 falls into one pocket of a bucket while deactivated catalyst from reactor 16 falls into another pocket of the aforesaid bucket.

Elevator spout 52 is provided with a divided discharge so constructed that regenerated catalyst falls through chutes 53 and 54 while contaminated or deactivated catalyst falls into chute 55.

The fines discharged from elevator spout 52 pass through conduit 56 to elutriator 70 where the larger particles are discharged through conduit 57 into chute 75 while the smaller particles pass through conduit 58 into cyclone 71. In cyclone 71 the catalyst particles pass out through conduit 72 while the gas escapes through vent 73.

The deactivated catalyst passes from elevator spout 52 through chute 55 in kiln or regenerator bin 59.

Kiln or regenerator 60 is of any suitable type wherein the carbonaceous catalyst contaminant can be burned off at elevated temperatures in a combustion supporting stream of gas at a temperature of about 600° to about 1400° F., and preferably at about 700° to about 1100° F., under a pressure of about 15 to about 600 p. s. i. a., and preferably about 15 to about 35 p. s. i. a. Presently, it is preferred to employ a multistage kiln or regenerator having alternate burning and cooling zones such as is more fully described in U. S. Patent No. 2,469,332. Briefly, the multistage kiln or regenerator comprises an uppermost surge section and about 6 to about 20 burning zones alternating with cooling zones, the number of burning stages or zones being dependent upon the amount of carbonaceous contaminant to be burned off the catalyst. The cooling zones or stages are provided with heat transfer tubes through which a heat transfer medium such as high pressure steam, water, low melting alloys, or fused inorganic salts can be passed. Details of the kiln are not shown in Figure 1.

The catalyst passes from bin or hopper 59 through conduit 61 into kiln 60, and descends through the alternating burning and cooling zones to a surge zone at the bottom of the kiln. When desirable the activated catalyst can be cooled in cooler 62 to a temperature of about 800° or less. The activated catalyst leaves kiln 60 and passes through conduit 63 into cooler 62. The cooled activated catalyst flows from cooler 62 into chute 75 and through chute 75 to boot 50 of elevator 49 to be raised by the buckets therein to elevator head 51. The activated catalyst is discharged into elevator spout 52 from which it flows by chutes 53 and 54 to reactor catalyst feed bin 11 ready to begin another cycle.

It will be understood by those skilled in the art that any other suitable catalyst transferring device such as a gas-lift or the like can be used in place of the elevator illustrated in Figure 1 to transfer the activated catalyst from the kiln discharge to the reactor catalyst feed bin.

The stock to be reformed can be any suitable mixture of hydrocarbons such as a straight run or virgin naphtha, a cracked naphtha or a mixture of straight run and cracked naphthas. Presently, it is preferred to reform naphthas having a boiling range of about 150° to about 450° F. The charge stock is drawn from a source not shown through line 77, heated to about 800–1100° F., preferably about 850° to about 950–1000° F. in furnace 78 and passed through line 79 under control of valve 80 to enter the reactor at about the mid-point thereof. A gas containing about 25 to about 80 percent and preferably about 35 to about 60 percent hydrogen, balance $C_1$ to $C_6$ hydrocarbons such as a recycle gas is drawn from holder 23 through pipe 25 and heated to about 850° to about 1300° F. in furnace 24 and passed through pipes 26, 27 and 101 under control of valve 102 to be mixed with the naphtha before the mixture enters the reactor.

In general, the naphtha or charge stock and the hydrogen containing gas are mixed in the proportions to provide about 1 to about 8 mols, preferably about 2 to about 5 mols of hydrogen per mol of charge stock. The charge stock and the hydrogen containing gas are heated to such temperatures that the mixture enters the reactor at about 850° to about 1080° F., preferably about 960° to about 1060° F. The charge mixture, i. e., charge stock and hydrogen-containing gas, contacts the substantially compact catalyst column in the reforming zones of reactor 16 which is maintained under reforming conditions of temperature and pressure dependent upon the required octane rating of the gasoline to be produced. Thus, for example, this distribution of the charge mixture above and below the reactor vapor inlet of reactor 16 can be controlled in conjunction with the ratio of the vapor stream heat capacity to the catalyst stream heat capacity and the inlet temperature of both vapors and catalyst so that the severity of reforming in the zone of the reactor above the reactor vapor inlet, i. e., top or upper zone, is less than the severity of reforming in the zone of the reactor below the reactor vapor inlet, i. e., the bottom or lower zone.

Control of the distribution of the charge mixture to the upper and lower reactor zones is obtained by regulation of the setting of valves 83 and 84 in reactor effluent lines 81 and 82. Valves 83 and 84 are of any suitable type whereby the volume of vapors passing therethrough can be maintained substantially constant at a predetermined level.

With valves 83 and 84 set to produce a distribution of the charge vapors of 95-5 percent and preferably about 75-25 percent to the upper zone, 5-95 percent of the vapors of the charge mixture travel upwardly from the reactor vapor inlet through the upper zone countercurrently to the downward passage of the catalyst particles as a substantially compact column. The balance, 95-5 percent of the vapors of the charge mixture travel downwardly from the reactor vapor inlet through the lower zone.

The effluent, i. e., reformate, and gas, from the upper zone passes through line 81 under control of throttle valve 83 through cooler 85 to gas-liquid separator 87.

The effluent, i. e., reformate and gas, from the lower zone passes through line 82 under control of throttle valve 84 through cooler 86 to gas-liquid separator 88.

Those skilled in the art will understand that the effluents from both zones can be cooled before instead of after passing through control valves 83 and 84.

To eliminate the need for a hydrogen producing plant or other extraneous source of hydrogen and to eliminate the need for an absorber to remove light hydrocarbons from the hydrogen-containing gas produced during reforming which is recycled and yet provide a recycle gas containing about 25 to about 80 percent and preferably about 35 to about 60 percent hydrogen, balance $C_1$ to $C_6$ hydrocarbons whereby the overall coke lay-down is maintained at least at a tolerable level, the composition of the gases separated in gas-liquid separators 87 and 88 must be determined and the separated gases mixed in such proportions as to provide a recycle gas having a hydrogen content within the aforesaid limits in a quantity sufficient to provide about 1 to about 8 mols, and preferably about 2 to about 5 mols, of hydrogen per mol of naphtha. To achieve this end, gas effluent pipes 89 and 90 from the liquid-gas separators 87 and 88 are provided with vents 91 and 92 under control of valves 93 and 94, respectively. Accordingly, when the hydrogen content of the hydrogen-lean gas, i. e., separator effluent gas having the lower hydrogen content, is below that required in the recycle gas to maintain the coke lay-down in both zones at a tolerable level, the hydrogen-lean gas is mixed with the relatively hydrogen-rich effluent gas from the other gas-liquid separator in the proportion to provide a mixed recycle gas having a hydrogen content sufficient to maintain the coke lay-down in both zones at a tolerable level dependent upon the kiln or regenerator capacity. Therefore, there will be two conditions. First, the circumstances under which the total volume of hydrogen-rich separator effluent gas and the hydrogen content thereof is such that in view of the hydrogen content and total volume of hydrogen lean separator effluent gas, the total volume of hydrogen-lean separator effluent gas can be mixed with the total volume of hydrogen-rich separator effluent gas to provide a recycle gas having a hydrogen content of about 25 to about 80 percent and preferably about 35 to about 60 percent hydrogen, balance $C_1$ to $C_6$ hydrocarbons, and sufficient to maintain the coke lay-down in both zones at a tolerable level. In this case, valves 93 and 94 would be closed and a portion of the mixed gases equivalent to the net gas make in both sections of reactor 16 is discarded through lines 103 and 105 under control of valve 104.

Second, the circumstances under which the hydrogen content and volume of hydrogen-rich separator effluent gas and the hydrogen content and volume of hydrogen-lean separator effluent gas are such that mixing of the total volume hydrogen-rich gas with the total volume of hydrogen-lean gas will provide a mixed recycle gas containing less than 25 to 35 percent hydrogen. Under such conditions, sufficient of the hydrogen-lean gas is bled-off to a gas plant so that the remaining hydrogen-lean gas when mixed with the total volume of hydrogen-rich gas will provide a mixed gas containing more than 25-35 percent hydrogen. Thus, referring now to Case III, supra, the top zone was operated under the less severe reforming conditions and the separator effluent gas was the hydrogen-rich gas and contained 48 percent hydrogen. The lower zone was operated under the relatively more severe conditions. The separator effluent gas therefrom was the hydrogen-lean gas and contained 44.1 percent hydrogen. Accordingly, the effluent from the upper zone was passed into separator 87, the condensable hydrocarbons withdrawn through line 97 and the separated effluent gases withdrawn through pipes 89 and 95 to pipe 100 with valve 93 in vent 91 closed.

The reformate and gases issuing from the lower zone were passed through cooler 86 into gas-liquid separator 88 from which the condensable hydrocarbons were withdrawn through line 98. The separator effluent gases contained 44.1 percent hydrogen and were passed through pipes 90 and 96 to pipe 100 with valve 94 in vent 92 open sufficiently to bleed off a volume of hydrogen-lean separator effluent gas equivalent to the total gas make in both the upper and lower sections of reactor 16. No gas is discarded through valve 104 in this operation. The remaining hydrogen-lean gas is passed into pipe 100 and is equivalent to about 30 percent of the total volume of hydrogen-rich and hydrogen-lean gases passing into pipe 100.

The foregoing proportion was determined as follows:

|  | Percent |
|---|---|
| Required hydrogen content of gas mixture | 46.8 |
| Hydrogen content of hydrogen-rich gases | 48.0 |
| Hydrogen content of hydrogen-lean gases | 44.1 |

$$\frac{.468-.441}{.48-.441}=\frac{.027}{.039}=69.2 \text{ percent}$$

hydrogen-rich separator effluent, 30.8 percent hydrogen-lean separator effluent gas. The separator effluent gases in the ratio of 70:30 pass through pipe 100 to gas holder 23 from which recycle gases containing about 46.8 percent hydrogen, balance $C_1$ to $C_6$ hydrocarbons, are drawn for use in both zones of the reactor.

Figure 2:
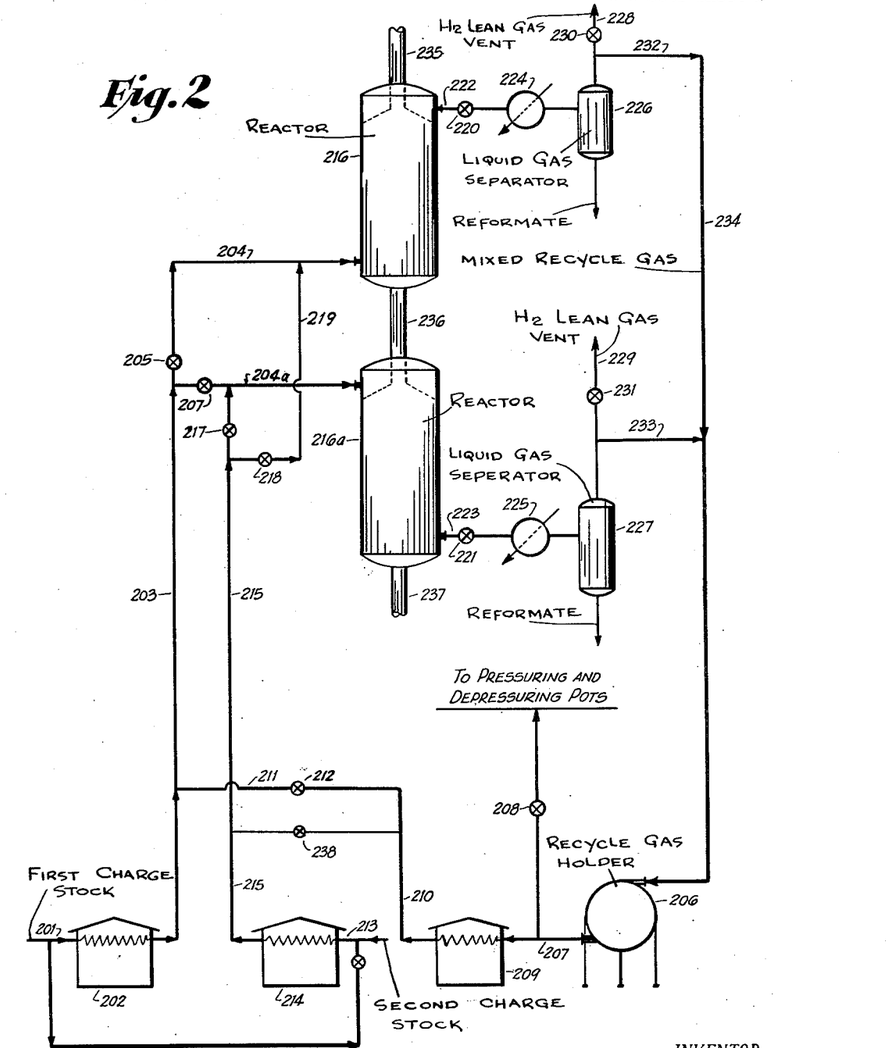
Figure 2 is a highly diagrammatic illustration of a method of operating two reformers in series in conjunction with a kiln such as illustrated in Figure 1 to produce simultaneously gasolines of different octane ratings and gases containing different concentrations of hydrogen in the two reformers wherein the overall coke lay-down is such as to be appreciably less than that produced in the reformer operating at the greater severity without raising the concentration of hydrogen in the gases produced in the reformer operating at the greater severity and without removing light hydrocarbons from the gases produced in the reformer operating at the greater severity.

Figure 2 is a highly diagrammatic illustration of two reactors in series that can be used in conjunction with the kiln shown in Figure 1 for producing gasolines of different octane ratings simultaneously while supplying recycle gas to both reactors of such hydrogen content as to maintain the coke lay-down at at least a tolerable level.

Thus, with the two reactors shown in Figure 2 one or two charge stocks or naphthas can be treated simultaneously under different conditions of severity. When only one stock is to be reformed under different conditions of severity, either furnace 214 or 202, or both, can be used although usually only one furnace will be used.

For the reforming of two stocks, one charge stock, for example, a virgin naphtha, is drawn from a source not shown through line 201 and is passed through furnace 202 wherein it is heated to the required temperature within the limits of about 850° to about 1080° F. From the furnace the heated virgin naphtha is passed into line 203. A suitable gas containing about 25 to 80 percent preferably about 35 to 60 percent hydrogen such as recycle gas contained in holder 206 is withdrawn through pipe 207, is passed into furnace 209, and is heated therein to about 850° to about 1300° F. The heated hydrogen-containing gas is passed through pipes 210 and 211 under control of valve 212 to line 203 in such proportion as to provide about 1 to about 8 and preferably about 2 to about 5 mols of hydrogen per mol of naphtha in pipe 203. The charge mixture of virgin naphtha and hydrogen-containing recycle gas is passed through line 203 to line 204 under control of valve 205. Line 204 is provided with a charge mixture distributor not shown by means of which the charge mixture is distributed over the cross-section of reactor 216.

When only one charge stock is being reformed, the charge mixture in line 203 is passed through line 204a under control of valve 207 into reactor 216a. Line 204a is likewise provided with a distributor not shown by means of which the charge mixture is distributed over the cross-section of reactor 216a. However, when two charge stocks are being reformed simultaneously, the second charge stock, say a cracked naphtha, is drawn from a source not shown through line 213, is heated in furnace 214 to the required temperature of about 850° to about 1080° F. is passed into line 215. A hydrogen-containing gas, such as the aforementioned recycle gas, is drawn from holder 206, is passed through furnace 209 wherein it is heated as aforesaid and is passed through line 210 into 215 under control of valve 238 to provide about 1 to about 8, preferably about 2 to about 5 mols of hydrogen per mol of naphtha in line 215. The charge mixture is passed from line 215 into line 204a with valve 217 open and valves 218 and 207 closed.

When the charge stock heated in furnace 214 is to be supplied to both reactors, a portion is directed through line 219 with valves 217 and 218 both open and valve 207 closed.

Line 204a as noted before, is provided with a distributor (not shown) of any suitable type whereby the charge mixture can be distributed over the cross-section of reactor 216a. The severity of reforming conditions for a given reaction temperature and pressure in each of reactors 216 and 216a is controlled by regulating the volume of reformate and gases passing through reformate lines 222 and 223. For this control any suitable type of valve by which the volume of passing effluent can be controlled such as throttle valves 220 and 221 are employed.

The reformate and gases produced in reactor 216 are passed through line 222 under control of throttle valve 220 and through cooler 224 into liquid-gas separator 226. The reformate and gases produced in reformer 216a are passed through line 223 under control of throttle valve 221 and through cooler 225 into gas-liquid separator 227.

The gases from liquid separators 226 and 227 are mixed in such proportion as to provide a hydrogen-containing gas containing about 25 to about 80 and preferably about 35 to about 60 percent hydrogen, balance $C_1$ to $C_6$ hydrocarbons, without the addition of hydrogen from an extraneous source and without removing light hydrocarbons from the separator effluent gases. In general, a portion of the hydrogen-lean gas equivalent to the total gas make in both reforming reactors is discarded from the system to a gas plant not shown through pipe 228 or pipe 229 and regulated by valves 230 or 231, respectively, depending upon which separator effluent gas is of the lower hydrogen concentration. That portion of the gases from liquid gas separator 226 which is to be recycled is passed through pipe 232 into pipe 234. That portion of the separator effluent gas from separator 227 which is to be recycled is passed through pipe 233 into pipe 234 whereby the gas mixture in pipe 234 has a hydrogen concentration to maintain the overall coke laydown in reactors 216 and 216a at at least a tolerable level. Such a gas mixture contains about 25 to about 80 percent, preferably 35 to 60 percent hydrogen, balance $C_1$ to $C_6$ hydrocarbons. The gas mixture is passed through line 234 to holder 206 where it is held ready for use in reactors 216 and 216a.

Those skilled in the art will understand that the passage of catalyst through the reactors 216 and 216a is similar to the passage of catalyst through reactor 16. That is to say, the catalyst flows from a pressuring pot such as pot 13 through a sealing means such as gas-tight valve 14 into a surge chamber and thence through conduit 235 corresponding to conduit 15 of Figure 1. The catalyst enters the reactor 216, flows downwardly therethrough, countercurrent to the upwardly flowing charge mixture vapors, as a substantially compact mass, flows through conduit 236 into reactor 216a and thence downwardly through reactor 216a as a substantially compact column concurrent with the downwardly flowing charge mixture vapors. The deactivated catalyst flows out of reactor 216a through conduit 237 corresponding to conduit 17 in Figure 1 and through a catalyst flow control device, reactor sealing means and surge chamber such as illustrated in Figure 1. From the reactor sealing means, the deactivated catalyst is transferred to a kiln such as kiln 60 of Figure 1, reactivated and transferred by any suitable means to a reactor catalyst feed bin such as 11 of Figure 1 ready to begin another catalyst cycle.

The relative volumes of reactors 216 and 216a can be varied within the limits of 20 to 80 percent of the total catalyst volume. That is to say, one reactor can have a volume which is 80 percent of the total catalyst volume and the other a volume which is 20 percent of the total catalyst volume or the first can have a volume which is 20 percent of the total catalyst volume and the other a volume which is 80 percent of the total catalyst volume. However, usually the reactors 216 and 216a are of equal catalyst volume as illustrated.

Two charge stocks can be treated simultaneously in the two reactors 216 and 216a under different conditions of reforming severity as the data presented in Table V.

TABLE V

Feed stocks:
  (1) West Texas virgin naphtha, BR–200°–400° F.—
    Octane number:
      F–1 (clear) ______________________________________ 55
      F–1+3 cc. TEL/gal __________________________ 70
  (2) Blend of (a) 55 volume percent California virgin naphtha and (b) 45 volume percent cracked naphtha from coking a California residuum:
    Octane number:
      F–1 (clear) ______________________________________ 65
      F–1+3 cc. TEL/gal __________________________ 76
Catalyst–chromia–alumina beads comprising at least 70 mol percent alumina, balance chromia.
Average operating conditions in reactor:
  Operating pressure ______________________ p. s. i. a __ 190
  Vapor inlet temp., ° F _________________________ 1030
  Catalyst inlet temp., ° F ________________________ 800
  Gas recycle ratio—
    Mols gas/mols naphtha _______________________ 6
    Mols hydrogen/mols naphtha _________________ 2.7
Vapor stream heat capacity/catalyst stream heat capacity __ 6

| | | |
|---|---|---|
| Percent of total on-stream time | 100 | |
| Reactor | 216 | 216a |
| Space Velocity | 0.7 | 0.7 |
| Catalyst Volume, percent of total | 50 | 50 |
| Charge Stock Number | 1 | 2 |
| Vapor Inlet Temp., ° F | 1,030 | 1,030 |
| Vapor Outlet Temp., ° F | 940 | 985 |
| Average Temp., ° F | 958 | 994 |
| Hydrogen Content: | | |
|   Effluent of Reactor after Liquid Condensation, mol percent | 49.1 | 38.2 |
|   Recycle Gas, mol percent | 44.2 | 44.2 |
| Effluent Gas from Reactor as percent of total Recycle Gas | 55 | 45 |
| Gasoline Octane Number: | | |
|   F–1 (clear) | 83.5 | 100.0 |
|   F–1 + 3 cc TEL/gal | 94.0 | 104.2 |
| Coke Yield: | | |
|   Weight percent Reactor Charge | 0.37 | 3.3 |
|   Lbs./hour on 10,000 B. P. S. D | 3,900 | |
|   Average weight percent on total naphtha charge to both reactors | 1.83 | |

When operating 50 percent of the on-stream time on one charge stock and 50 percent of the on-stream time on the other charge stock, the following results are obtained,

TABLE VI

Feed stocks:
  (1) West Texas virgin naphtha, BR-200°-400° F.—
    Octane number:
      F-1 (clear)_________________________________________ 55
      F-1+3 cc. TEL/gal__________________________________ 70
  (2) Blend of (a) 55 volume percent California virgin naphtha and (b) 45 volume percent cracked naphtha from coking a California residuum—
    Octane number:
      F-1 (clear)_________________________________________ 65
      F-1+3 cc. TEL/gal__________________________________ 76
Catalyst-chromia-alumina beads comprising at least 70 mol percent alumina, balance chromia.
Average operating conditions in reactor:
  Operating pressure_________________________________p. s. i. a__ 190
  Vapor inlet temp., °F_______________________________________ 1030
  Catalyst inlet temp., °F_____________________________________ 800
  Gas recycle ratio—
    Mols gas/mols naphtha____________________________________ 6
Vapor stream heat capacity/catalyst stream heat capacity__________ 6

*Normal once-through blocked-out operation*

| | | |
|---|---:|---:|
| Percent of total on-stream time | 50 | 50 |
| Reactor | 216 / 216a | 216 / 216a |
| Space Velocity | 0.7 | 0.7 |
| Charge Stock Number | 1 | 2 |
| Average Vapor Inlet Temp., °F | 1,009 | 1,025 |
| Average Vapor Outlet Temp., °F | 950 | 971 |
| Average Temp., °F | 962 | 982 |
| Hydrogen Content: | | |
|   Reactor Effluent after Liquid Condensation, mol percent | 60.5 | 20.4 |
|   Recycle Gas, mol percent | 60.5 | 20.4 |
|   Mols Hydrogen/Mols Naphtha | 3.6 | 1.2 |
| Effluent Gas from Reactors after Liquid Condensation as percent of total Recycle Gas | 117 | 125 |
| Gasoline Octane Number: | | |
|   F-1 (clear) | 83.5 | 100.0 |
|   F-1+3 cc. TEL/gal | 94.0 | 104.2 |
| Coke Yield: | | |
|   Weight percent Reactor Charge | 0.25 | 9.6 |
|   Lbs./hour on 10,000 B. P. S. D. | 270 | 10,600 |
|   Average on all naphtha charged to unit, weight percent | 4.92 | |

Those skilled in the art will observe that in the operation during which the No. 2 charge stock was treated alone, the coke lay-down on a 10,000 B. P. S. D. was 10,600 pounds per hour. On the other hand, when both stocks were treated simultaneously the coke lay-down for 10,000 B. P. S. D. was only 3900 pounds per hour. In other words, the coke lay-down was about 37 percent of that produced when reforming the No. 2 stock. This improvement was obtained without the addition of hydrogen from an extraneous source or without removal of sufficient light hydrocarbons to raise the hydrogen content of the hydrogen-lean reactor effluent gas to the required hydrogen content but by mixing the hydrogen-rich separator effluent gas with the hydrogen-lean effluent gas in such proportion as to produce a recycle gas having a hydrogen content between about 25 to about 80 percent and preferably between about 35 and about 60 percent.

Figure 3:
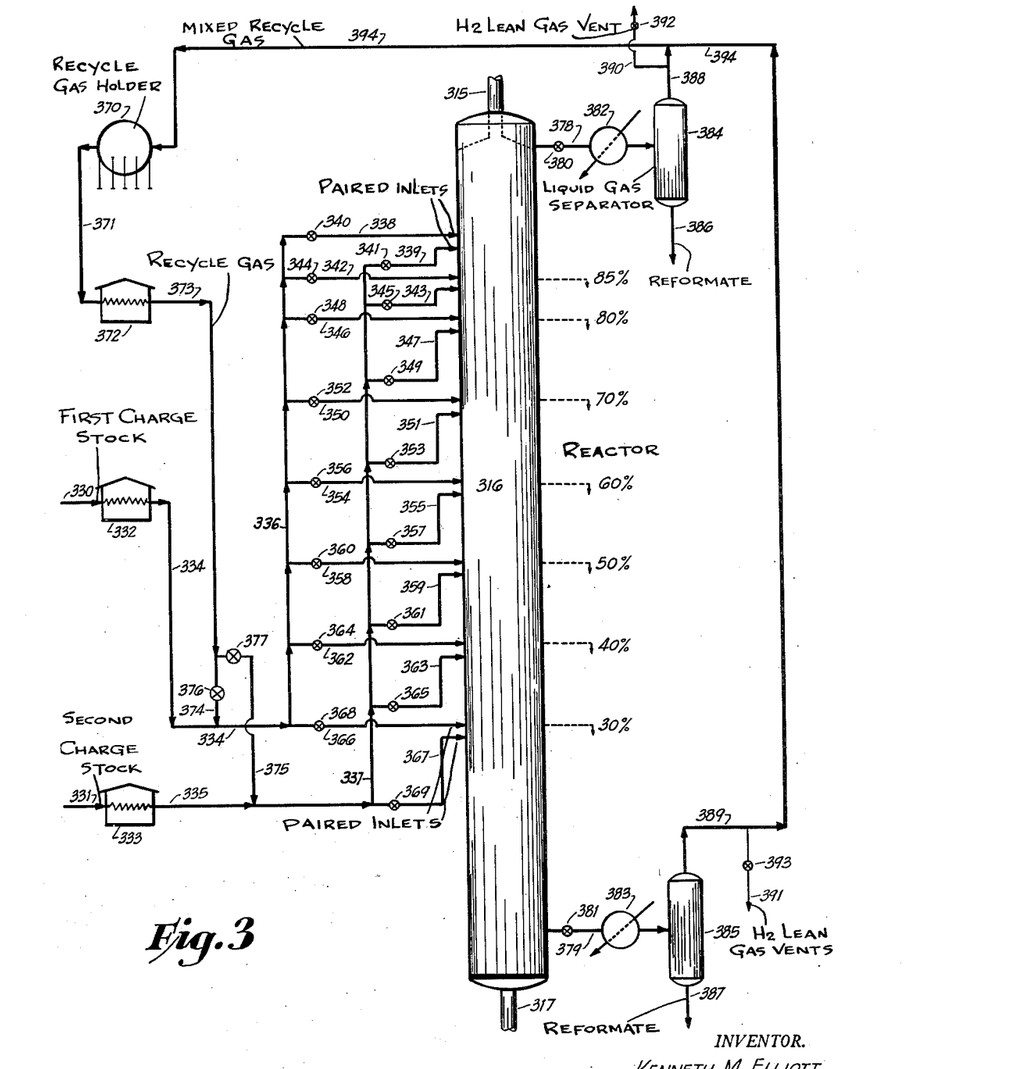
Figure 3 is a highly diagrammatic illustration of a method of operating a single reformer in conjunction with a kiln such as illustrated in Figure 1 in accordance with the principles of the present invention to produce simultaneously gasolines of different octane ratings and gases containing different concentrations of hydrogen in the different zones wherein the overall coke lay-down is such as to be appreciably less than that produced without raising the concentration of hydrogen in the gases produced in the zone of greater severity by the addition thereto of hydrogen from an extraneous source or by removing light hydrocarbons from the gases produced in the zone of greater severity.

Referring now to Figure 3. The reactor illustrated in a highly diagrammatic manner in Figure 3 can be used in conjunction with the reactor feeding and sealing means or other suitable sealing means and the kiln illustrated in Figure 1. The reactor illustrated in Figure 3 provides great flexibility in that the total catalyst bed can be readily divided into reforming zones of different volumes and the distribution of the charge mixture can also be controlled. Division of the catalyst bed is obtained by employing different pairs of charge mixture inlets.

Thus, charge stock is drawn from a source (not shown) through line 330, passed through furnace 332 wherein it is heated to about 850° to about 1080°, preferably about 960° to about 1060° F. and is passed into line 334. Another charge stock is drawn from a source not shown through line 331, passed through heater 333 wherein it is heated to about 850° to about 1080°, preferably about 960° to about 1080° F., and is passed into line 335.

A hydrogen-containing gas such as recycle gas containing about 25 to about 80 percent, preferably about 35 percent to about 60 percent hydrogen and the balance $C_1$ to $C_6$ hydrocarbons stored in holder 370 is drawn through pipe 371 heated in furnace 372 to about 850° to about 1300° F. and is passed into pipe 373. Recycle gas from pipe 373 is admitted to lines 334 and 335 through pipes 374 and 375, respectively, under control of valves 376 and 377, respectively, to provide about 1 to about 8, preferably about 2 to about 5 mols of hydrogen per mol of naphtha. The charge mixtures thus obtained are passed into manifolds 336 and 337, respectively.

Dependent upon the catalyst bed split required the pairs of reactor inlets 338—339 to 366—367 are used. Each reactor inlet is provided with a distributor (not shown) by means of which the charge mixture admitted thereto is distributed over the cross-section of the reactor. For example, it may be necessary in order to obtain the reforming conditions required to split the catalyst bed so that 70 percent of the total volume of catalyst in the reactor 316 is below the charge mixture inlets. With such a requirement inlet pairs 350—351 would be used. If it were necessary to split the catalyst bed in such a manner that 40 percent of the total volume of catalyst in the reactor is below the charge mixture inlets, inlet pairs 362—363 and their respective distributors would be used. In accordance therewith, the charge mixture No. 1 is admitted to reactor 316 through charge mixture inlets 338, 342, 346, 350, 354, 358, 362, or 366 under the control of valves 340, 344, 348, 352, 356, 360, 364 and 368, respectively, and their respective distributors. Having fixed the charge inlet through which charge mixture No. 1 is to be admitted to the reactor, it is generally good practice to admit charge mixture No. 2 through the other member of the pair and its distributor. Charge mixture No. 2 is admitted to reactor 316 through inlets 339, 343, 347, 351, 355, 359, 363 or 367 under control of valves 341, 345, 349, 353, 357, 361, 365 and 369, respectively, and their respective distributors.

Reformate, i. e., product and make and recycle gas, is withdrawn from reactor 316 through lines 378 and 379 under the control of suitable throttling devices such as throttle valves 380 and 381 whereby the volume of vapors passing through the valve or other throttling device is regulated and maintained substantially constant. By this regulation of the volume of vapors passing through lines 378 and 379, the distribution of charge mixture vapors in the two zones is regulated and controlled thereby in conjunction with the volume of the bed in each zone, the temperature in each zone and the pressure regulating the severity of reforming conditions in each zone.

The reformate from the upper zone passes through line 378 under regulation of throttle device 380 through cooler 382 into gas-liquid separator 384. The condensable hydrocarbons in separator 384 are withdrawn through line 386. The non-condensable gas or separator gas effluent is withdrawn through pipe 388.

The reformate from the lower zone passes through line 379 under regulation of throttle device 381 into cooler 383 and thence to liquid-gas separator 385. In liquid-gas separator 385 the condensed hydrocarbons are withdrawn through line 387 and the separator effluent gas is withdrawn through line 389.

Dependent upon the hydrogen concentration of the gases from both separators and the required hydrogen concentration in the recycle gas, valves 392 and/or 393 in lines 390 and 391, respectively, are kept closed or one or the other open to the necessary extent to provide the proportion in which the hydrogen-rich separator gas effluent from the one separator is to be mixed with the hydrogen-lean separator gas effluent from the other separator. For example, when the separator effluent gas in pipe 389 is hydrogen-lean and the separator effluent gas in pipe 388 is hydrogen-rich, valve 393 is opened sufficiently to bleed off the hydrogen-lean gas in pipe 389 in excess of that which when mixed in pipe 394 with the hydrogen-rich gas in pipe 383 will provide a recycle gas having a hydrogen concentration of about 25 percent to about 80 percent, preferably about 35 percent to about 60 percent. Under these conditions valve 392 in pipe 390 is closed. The hydrogen-lean gas bled from pipe 389 is vented through pipe 391 to a gas plant (not shown). When necessary or desirable to bleed gas from pipe 388, valve 392 in pipe 390 is opened and the gas passed to the gas plant. In this manner, a recycle gas is obtained having a hydrogen concentration of about 25 percent to about 80 percent, preferably about 35 percent to about 60 percent which when used as a recycle gas in both zones of the reactor maintains the coke lay-down at at least a tolerable level without the addition of hydrogen from an extraneous source or by absorbing light hydrocarbons. The recycle gas in pipe 394 passes to holder 370 ready for use in treating more naphtha.

Catalyst in a reactor feed bin such as 11 (Figure 1) passes through a suitable reactor sealing means such as gas-tight valve 12, pressuring pot 13 and gas-tight valve 14 and surge chamber 64 to flow through conduit 315 (corresponding to conduit 65, Figure 1) as a substantially compact column into reactor 316. The catalyst flows downwardly as a substantially compact column in reactor 316 countercurrent to the upwardly flowing charge mixture vapors in the upper reforming zone and concurrently with the downwardly flowing charge mixture vapors in the lower reforming zone of reactor 316. The catalyst becomes deactivated in passage through reactor 316 and leaves the reactor through conduit 317 to pass through a catalyst flow control device such as 18 (Figure 1), a surge pot such as 19 (Figure 1) and a reactor sealing means such as gas-tight valve 20, depressuring pot 21 and gas-tight valve 22 to a surge pot such as 66 and thence to a suitable catalyst transferring device such as a gas-lift or bucket elevator by means of which it is transferred to the kiln to be reactivated.

Those skilled will understand that the condensed hydrocarbons withdrawn from separators 87, 88, 226, 227, 384 and 385 can be treated further, distilled and stored separately, or combined as the exigencies of the situation demand.

A single naphtha can also be treated in a reactor of the design diagrammatically illustrated in Figure 3. Thus, virgin Venezuelan naphtha having a boiling range of 200°–400° F. can be heated in furnace 332 or 333 and conveyed through the appropriate pipes and introduced into reactor 316 at about the mid-point thereof by the use of either vapor inlet 358 or 359. As in the previous cases a gas containing about 25 to about 80 percent, preferably about 35 to about 60 percent hydrogen, balance $C_1$ to $C_6$ hydrocarbons is drawn from holder 370, heated in furnace 372 and mixed with the naphtha in either line 334 or line 335 depending upon which furnace is being used. Throttle valves 380 and 381 are adjusted to cause 67 percent of the naphtha vapors to pass upwardly from the reactor vapor inlet 358 or 359 and the balance to pass downwardly. The data for such an operation are presented in Table VII.

TABLE VII

Feed Stock:
 Virgin Venezuelan naphtha B. R. 200°–400° F.—
  Octane No.—
   F-1 (clear)______________________________________ 39
   F-1+3 cc. TEL/gal_______________________________ 59
Catalyst: Chromia-alumina beads comprising at least 70 mol percent alumina, balance chromia.
Average operating conditions:
 Operating pressure__________________________p. s. i. a__ 190
 Space velocity_______________________________________ 0.7
 Vapor inlet temp., °F_______________________________ 1050
 Catalyst inlet temp., °F____________________________ 800
 Vapor stream heat capacity/catalyst stream heat capacity___ 6

| Section of Reactor | Top | Bottom |
|---|---|---|
| Percent of total on-stream time | 100 | 100 |
| Catalyst Volume, percent of total | 50 | 50 |
| Vapor Volume, percent of total | 67 | 33 |
| Vapor Inlet Temp., °F | 1,050 | 1,050 |
| Vapor Outlet Temp., °F | 961 | 996 |
| Average Temp., °F | 979 | 1,007 |
| Hydrogen Content: | | |
|   Reactor Section Effluent, mol percent | 48.0 | 44.1 |
|   Recycle Gas, mol percent | 46.8 | 46.8 |
| Effluent Gas as percent of total Recycle Gas | 69.8 | 30.2 |
| Octane Number: | | |
|   F-1 (clear) | 87.0 | 99.0 |
|   F-1+3 cc. TEL/gal | 96.3 | 104.3 |
| Coke Yield: | | |
|   Weight percent reactor section charge | 0.52 | 2.5 |
|   Lb./hour (10,000 B. P. S. D.) | 1300 | |
|   Average on all naphtha charged to unit | 1.18 | |

It will be observed that the overall coke make under the foregoing conditions on a 10,000 B.P.S.D. unit is about 1300 pounds per hour. Had the high octane rating gasoline been made in a blocked-out operation, the coke yield on the high severity operation would have been about 4400 pounds of coke per hour on a 10,000 B.P.S.D. unit.

It is manifest that the method of reforming mixtures of hydrocarbons simultaneously under reforming conditions of different severity comprises passing a particle form reforming catalyst successively through a plurality of reforming zones of different severities in which the severity in each zone is controlled by the volume of catalyst in the zone, the volume of charge mixture vapors passing therethrough, and further wherein the ratio of vapor stream heat capacity to catalyst stream heat capacity is about 80 to about 0.05 and preferably about 40 to about 0.2 whereby the effluent gases from the different reforming zones have different hydrogen concentrations providing hydrogen-rich gas and hydrogen-lean gas and that the overall coke lay-down is maintained at at least a tolerable level not by the addition of hydrogen from an extraneous source and not by absorbing light hydrocarbons therefrom but by mixing the hydrogen-rich reforming zone effluent gases with the hydrogen-lean effluent gases from the other reforming zone in a proportion to provide a mixed gas suitable for use as a recycle gas having a hydrogen concentration sufficient to maintain the overall coke lay-down of both reforming zones at at least a tolerable level and about 25 to 80 percent, preferably about 35 to 60 percent hydrogen, balance $C_1$ to $C_6$ hydrocarbons. It is also within the scope of the present invention to reform mixtures of hydrocarbon-containing hydrocarbons convertible to aromatic hydrocarbons wherein not more than about 25 percent of the heat required above the level of the reactor temperature in the first reforming zone is carried into said first reforming zone by the catalyst and at least 75 percent of the total heat requirement for both zones is supplied by the charge mixture vapors.

I claim:

1. A method of operating a reforming reactor to produce reformed gasolines of different increased anti-knock rating at maximum capacity while not exceeding the coke combustion rate of the concomitantly operated kiln, which consists essentially in establishing two reaction zones and a kiln, circulating particle-form solid reforming catalyst successively through said reaction zones and said kiln, introducing completely vaporized feed naphtha to be reformed into the first of said reaction zones under given reforming conditions of temperature, pressure and space velocity to produce a first reaction zone effluent comprising a reformed gasoline of given anti-knock rating higher than the anti-knock rating of said feed naphtha and a first hydrogen-containing gas for recycle having a hydrogen concentration in excess of that required to control the deposition of coke in said reaction zone to a tolerable level not exceeding the coke burning capacity of said kiln, simultaneously introducing completely vaporized feed naphtha to be reformed into the second of said reaction zones under more severe reforming conditions of temperature, pressure and space velocity than the aforesaid given reforming conditions to produce a second reaction zone effluent comprising a reformed gasoline of higher anti-knock rating than the aforesaid given anti-knock rating and a second hydrogen-containing gas for recycle having a hydrogen concentration lower than that required to control the deposition of coke in said second reaction zone to a tolerable level not exceeding the coke-burning capacity of said kiln, separating said first hydrogen-containing gas from said first reaction zone effluent, separating said second hydrogen-containing gas from said second reaction zone effluent, venting a portion of said second hydrogen-containing gas, said vented portion of said second hydrogen-containing gas having substantially the same composition as said second hydrogen-containing gas when separated from said second reaction zone effluent, mixing the unvented balance of said second hydrogen-containing gas having substantially the same composition as said second hydrogen-containing gas when separated from said second reaction zone effluent with said first hydrogen-containing gas having substantially the same composition as said first hydrogen-containing gas when separated from said first reaction zone effluent to produce a hydrogen-containing mixed recycle gas having a hydrogen concentration higher than said second hydrogen-containing gas and sufficient to control the coke deposition in both of said reaction zones to a tolerable level not exceeding the coke-burning capacity of said kiln and introducing said hydrogen-containing mixed recycle gas into both reaction zones.

2. The method of operating a reforming reactor to product reformed gasolines of different increased anti-knock rating at maximum capacity while not exceeding the coke combustion rate of the concomitantly operated kiln as set forth and described in claim 1 wherein the volume of catalyst in the first of said two reaction zones is 20 to 80 percent of the total catalyst volume in both of said reaction zones, wherein 5 to 95 percent of the completely vaporized feed naphtha introduced into both of said reaction zones is introduced into the aforesaid first of said two reaction zones, wherein the ratio of the vapor stream heat capacity to the catalyst stream heat capacity is 0.05 to 80, wherein the recycled gas ratio is 1 to 8 mols of hydrogen per mol of feed naphtha, and wherein the space velocity is 0.1 to 6.0 liquid volumes of feed naphtha per volume of catalyst per hour.

3. The method of operating a reforming reactor to produce reformed gasolines of different increased anti-knock rating at maximum capacity while not exceeding the coke combustion rate of a concomitantly operated kiln as described and set forth in claim 1 wherein the volume of catalyst in the first of said two reaction zones is 25 to 75 percent of the total catalyst volume in both of said reaction zones, wherein 25 to 75 percent of the completely vaporized feed naphtha introduced into both reaction zones is introduced into the aforesaid first reaction zone of said two reaction zones, wherein the ratio of the vapor stream heat capacity to the catalyst stream heat capacity is 0.2 to 40, wherein the recycled gas ratio is 2 to 5 mols of hydrogen per mol of feed naphtha, and wherein the space velocity is 0.5 to 2.0 liquid volume of naphtha per volume of catalyst per hour.

References Cited in the file of this patent

UNITED STATES PATENTS

| | | |
|---|---|---|
| 2,304,183 | Layng et al. | Dec. 8, 1942 |
| 2,324,165 | Layng et al. | July 13, 1943 |
| 2,338,573 | Creelman | Jan. 4, 1944 |
| 2,419,517 | Eastwood | Apr. 22, 1947 |
| 2,485,073 | Shiffler et al. | Oct. 18, 1949 |